(12) United States Patent
Saifuddin et al.

(10) Patent No.: US 6,603,752 B1
(45) Date of Patent: Aug. 5, 2003

(54) METHOD AND SYSTEM FOR CONTROLLING TRANSMISSION ENERGY IN A VARIABLE RATE GATED COMMUNICATION SYSTEM

(76) Inventors: Ahmed Saifuddin, 5775 Morehouse Dr., San Diego, CA (US) 92121; Sandip Sarkar, 9414 Galvin Ave., San Diego, CA (US) 92126; Edward G. Tiedemann, Jr., 4350 Bromfield Ave., San Diego, CA (US) 92122

( * ) Notice: Subject to any disclaimer, the term of this patent is extended or adjusted under 35 U.S.C. 154(b) by 0 days.

(21) Appl. No.: 09/363,545

(22) Filed: Jul. 29, 1999

(51) Int. Cl.[7] .............................. H04B 7/216; H04B 7/00
(52) U.S. Cl. ..................... 370/335; 370/342; 455/522
(58) Field of Search .......................... 455/522, 68, 69, 455/70, 67.1, 38.3, 403, 125; 370/311, 335, 342

(56) References Cited

U.S. PATENT DOCUMENTS

| | | | |
|---|---|---|---|
| 4,901,307 A | 2/1990 | Gilhousen et al. | ............ 370/18 |
| 5,056,109 A | 10/1991 | Gilhousen et al. | ............. 375/1 |
| 5,103,459 A | 4/1992 | Gilhousen et al. | ............. 375/1 |
| 5,109,390 A | 4/1992 | Gilhousen et al. | ............. 375/1 |
| 5,414,796 A | 5/1995 | Jacobs et al. | ............... 395/2.3 |
| 5,504,773 A | 4/1996 | Padovani et al. | ............ 375/200 |
| 5,506,865 A | 4/1996 | Weaver, Jr. | .................. 375/205 |
| 5,528,593 A * | 6/1996 | English et al. | ............... 455/403 |
| 5,535,239 A * | 7/1996 | Padovani et al. | |
| 5,629,934 A * | 5/1997 | Ghosh et al. | ................ 370/335 |
| 5,659,569 A | 8/1997 | Padovani et al. | ........... 370/479 |
| 5,924,043 A | 7/1999 | Takano | |
| 5,933,781 A * | 8/1999 | Willenegger et al. | ........ 370/342 |
| 6,178,313 B1 * | 1/2001 | Mages et al. | ................ 455/127 |

FOREIGN PATENT DOCUMENTS

| | | |
|---|---|---|
| WO | 9718643 | 5/1997 |
| WO | 9836508 | 8/1998 |

* cited by examiner

*Primary Examiner*—Steven Nguyen
(74) *Attorney, Agent, or Firm*—Philip R. Wadsworth; Charles D. Brown; Kyong H. Macek

(57) ABSTRACT

Controlling transmission energy in a variable rate communication system that gates out portions of a frame in a predetermined and predicable fashion. In particular, the present invention describes a method and apparatus which identifies closed loop power control commands that have been generated erroneously based on portions of a frame that have been gated. The identified power control commands are ignored. In an alternative embodiment, if identification of the erroneous power control commands occurs after response measures have been taken, the transmitting station responds by setting the transmission energy back to the state it would have been in had the erroneous power control commands been identified prior to the response.

16 Claims, 9 Drawing Sheets

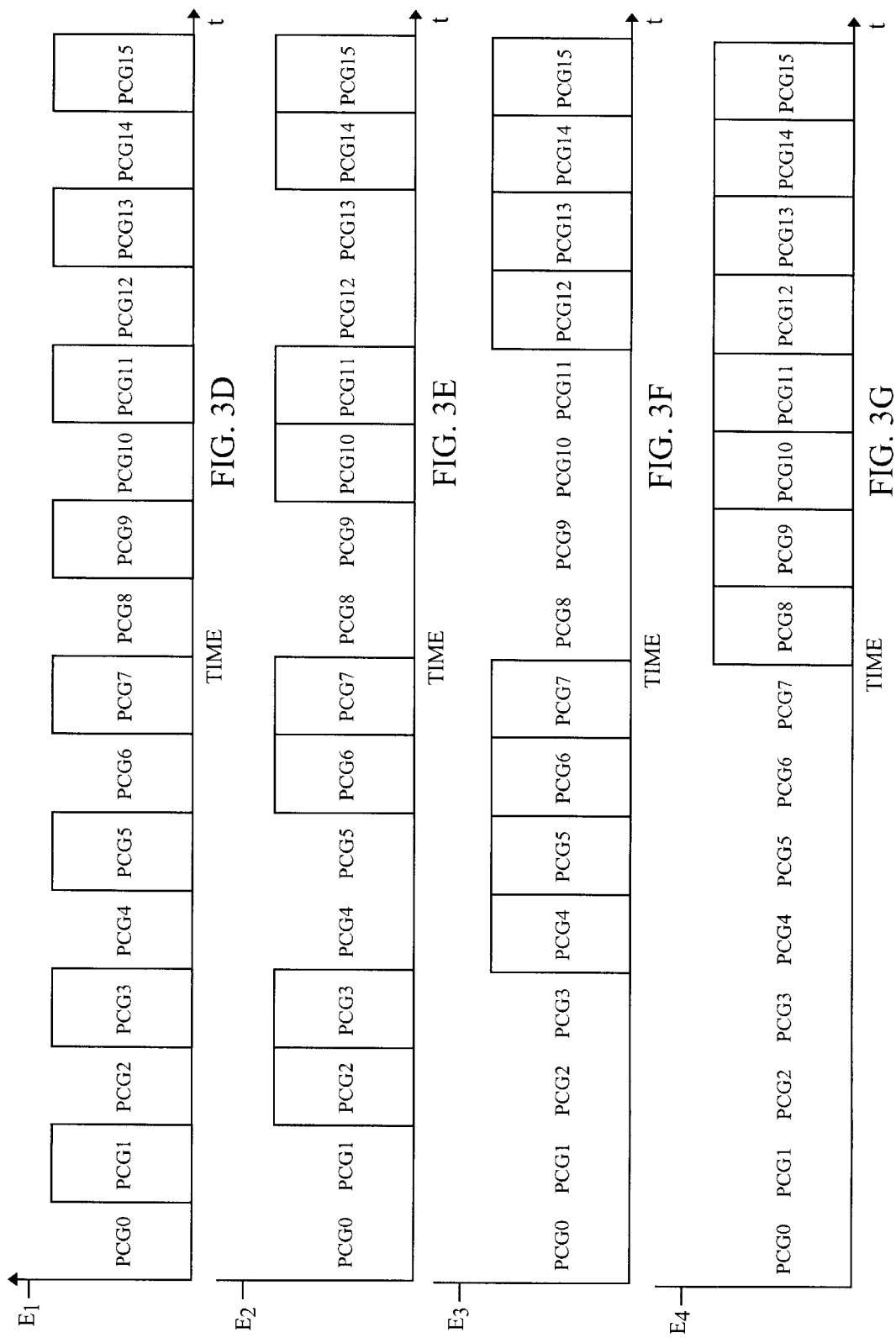

METHOD AND SYSTEM FOR CONTROLLING TRANSMISSION ENERGY IN A VARIABLE RATE GATED COMMUNICATION SYSTEM

BACKGROUND OF THE INVENTION

I. Field of the Invention

The present invention relates to communications. More particularly, the present invention relates to a novel and improved method and apparatus for controlling transmission energy in a wireless communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation techniques of CDMA have significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,5031 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, entitled "VARIABLE RATE VOCODER", assigned to the assignee of the present invention and incorporated by reference herein.

The use of a variable rate speech encoder provides for data frames of maximum speech data capacity when the speech encoder is providing speech data at a maximum rate. When the variable rate speech encoder is providing speech data at a less than maximum rate, there is excess capacity in the transmission frames. A method for transmitting additional data in transmission frames of a fixed predetermined size, wherein the source of the data for the data frames is providing the data at a variable rate, is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In the above mentioned patent application a method and apparatus is disclosed for combining data of differing types from different sources in a data frame for transmission.

In frames containing less data than a predetermined capacity, power consumption may be lessened by transmission gating a transmission amplifier such that only parts of the frame containing data are transmitted. Furthermore, message collisions in a communication system may be reduced if the data is placed into frames in accordance with a predetermined pseudorandom process. A method and apparatus for gating the transmission and for positioning the data in the frames is disclosed in U.S. Pat. No. 5,659,569, entitled "DATA BURST RANDOMIZER", assigned to the assignee of the present invention and incorporated by reference herein.

A useful method of power control of a mobile in a communication system is to monitor the power of the received signal from the wireless communication device at a base station. In response to the monitored power level, the base station transmits power control bits to the wireless communication device at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention and incorporated boy reference herein.

In a communication system that provides data using a Quadrature Phase Shift Keying (QPSK) modulation format, very useful information can be obtained by taking the cross product of the I and Q components of the QPSK signal. By knowing the relative phases of the two components, one can determine roughly the velocity of the wireless communication device in relation to the base station. A description of a circuit for determining the cross product of the I and Q components in a QPSK modulation communication system is disclosed in U.S. Pat. No. 5,506,865, entitled "PILOT CARRIER DOT PRODUCT CIRCUIT", assigned to the assignee of the present invention and incorporated by reference herein.

There has been an increasing demand for wireless communications systems to be able to transmit digital information at high rates. One method for sending high rate digital data from a wireless communication device to a central base station is to allow the wireless communication device to send the data using spread spectrum techniques of CDMA. One method that is proposed is to allow the wireless communication device to transmit its information using a small set of orthogonal channels. Such a method is described in detail in co-pending U.S. patent application Ser. No. 08/886,604, entitled "HIGH DATA RATE CDMA WIRELESS COMMUNICATION SYSTEM", assigned to the assignee of the present invention and incorporated by reference herein.

In the just-mentioned application, a system is disclosed in which a pilot signal is transmitted on the reverse link (the link from the wireless communication device to the base station) to enable coherent demodulation of the reverse link signal at the base station. Using the pilot signal data, coherent processing can be performed at the base station by determining and removing the phase offset of the reverse link signal. Also, the pilot data can be used to optimally weigh multipath signals received with different time delays before being combined in a rake receiver. Once the phase offset is removed, and the multipath signals properly weighted, the multipath signals can be combined to decrease the power at which the reverse link signal must be received for proper processing. This decrease in the required receive power allows greater transmission rates to be processed successfully, or conversely, the interference between a set of reverse link signals to be decreased.

While some additional transmit power is necessary for the transmission of the pilot signal, in the context of higher transmission rates the ratio of pilot signal power to the total reverse link signal power is substantially lower than that associated with lower data rate digital voice data transmission cellular systems. Thus, within a high data rate CDMA system, the $E_b/N_0$ gains achieved by the use of a coherent reverse link outweigh the additional power necessary to transmit pilot data from each wireless communication device.

However, when the data rate is relatively low, a continuously-transmitted pilot signal on the reverse link contains more energy relative to the data signal. At these low rates, the benefits of coherent demodulation and reduced interference provided by a continuously-transmitted reverse link pilot signal may be outweighed by the decrease in talk time and system capacity in some applications.

SUMMARY OF THE INVENTION

The present invention is a novel and improved method and system for controlling transmission energy in a variable rate communication system that gates out portions of a frame in a predetermined and predicable fashion. In particular, the present invention describes a method and apparatus which identifies closed loop power control commands that have been generated erroneously based on portions of a frame that have been gated. The identified power control commands are ignored. In an alternative embodiment, if identification of the erroneous power control commands occurs after response measures have been taken, the transmitting station responds by setting the transmission energy back to the state it would have been in had the erroneous power control commands been identified prior to the response.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 3A–3G illustrate the energy used to transmit the variable rate frames t for four different data rates including four alternative embodiments for transmitting an eighth rate frame;

DETAILED DESCRIPTION OF THE PREFERRED EMBODIMENTS

Figure 1:
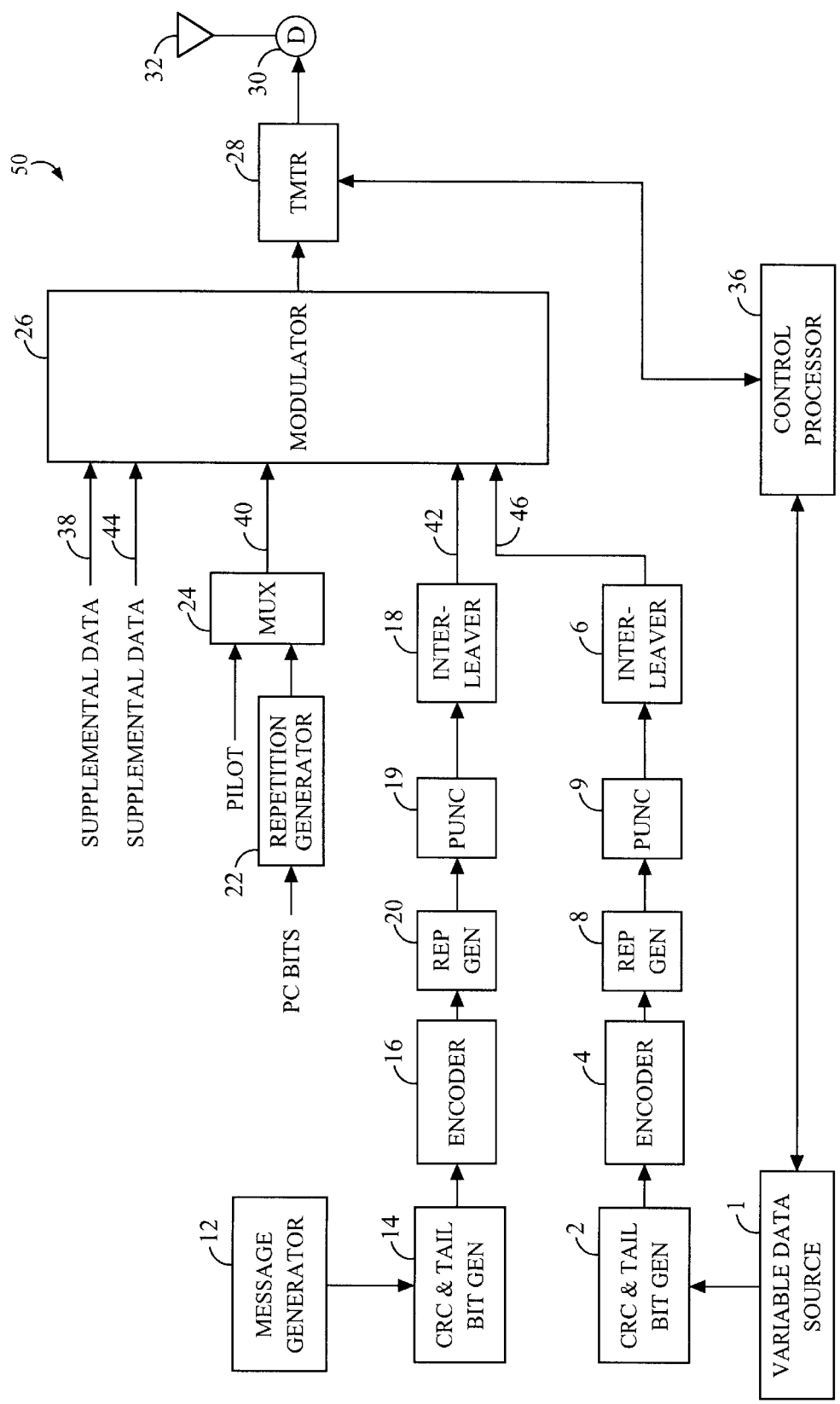
FIG. 1 is a functional block diagram of an exemplary embodiment of the transmission system of the present invention embodied in wireless communication device 50.

FIG. 1 illustrates a functional block diagram of an exemplary embodiment of the transmission system of the present invention embodied in wireless communication device 50. It will be understood by one skilled in the art that the methods described herein could be applied to, transmission from a central base station (not shown) as well. It will also be understood that various of the functional blocks shown in FIG. 1 may not be present in other embodiments of the present invention. The functional block diagram of FIG. 1 corresponds to an embodiment that is useful for operation according to the TIA/EIA Standard IS-95C, also referred to as IS2000. Other embodiments of the present invention are useful for other standards including Wideband CDMA (WCDMA) standards as proposed by the standards bodies ETSI and ARIB. It will be understood by one skilled in the art that owing to the extensive similarity between the reverse link modulation in the WCDMA standards and the reverse link modulation in the IS-95C standard, extension of the present invention to the WCDMA standards is easily accomplished.

In the exemplary embodiment of FIG. 1, the wireless communication device transmits a plurality of distinct channels of information which are distinguished from one another by short orthogonal spreading sequences as described in the aforementioned U.S. patent application Ser. No. 08/886,604. Five separate code channels are transmitted by the wireless communication device: 1) a first supplemental data channel 38, 2) a time multiplexed channel of pilot and power control symbols 40, 3) a dedicated control channel 42, 4) a second supplemental data channel 44 and 5) a fundamental channel 46. The first supplemental data channel 38 and second supplemental data channel 44 carry digital data which exceeds the capacity of the fundamental channel 46 such as facsimile, multimedia applications, video, electronic mail messages or other forms of digital data. The multiplexed channel of pilot and power control symbols 40 carries pilots symbols to allow for coherent demodulation of the data channels by the base station and power control bits to control the energy of transmissions of the base station or base stations in communication with wireless communication device 50. Control channel 42 carries control information to the base station such as modes of operation of wireless communication device 50, capabilities of wireless communication device 50 and other necessary signaling information. Fundamental channel 46 is the channel used to carry primary information from the wireless communication device to the base station. In the case of speech transmissions, the fundamental channel 46 carries the speech data.

Supplemental data channels 38 and 44 are encoded and processed for transmission by means not shown and provided to modulator 26. Power control bits are provided to repetition generator 22 which provides repetition of the power control bits before providing the bits to multiplexer (MUX) 24. In multiplexer 24 the redundant power control bits are time multiplexed with pilot symbols and provided on line 40 to modulator 26.

Message generator 12 generates necessary control information messages and provides the control message to CRC and tail bit generator 14. CRC and tail bit generator 14 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 16 which provide forward error correction coding upon the control message. The encoded symbols are provided to repetition generator 20 which repeats the encoded symbols to provide additional time diversity in the transmission. Following repetition generator certain symbols are punctured according to some predetermined puncturing pattern by puncturing element (PUNC) 19 to provide a predetermined number of symbols within the frame. The symbols are then provided to interleaver 18 which reorders the symbols in accordance with a predetermined interleaving format. The interleaved symbols are provided on line 42 to modulator 26.

Variable rate data source 1 generates variable rate data. In the exemplary embodiment, variable rate data source 1 is a variable rate speech encoder such as described in aforementioned U.S. Pat. No. 5,414,796. Variable rate speech encoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate date source 1 provides the encoded speech frame to CRC and tail bit generator 2. CRC and tail bit generator 2 appends a set of cyclic redundancy check bits which are parity bits used to check the accuracy of the decoding at the base station and appends a predetermined set of tail bits to the control message in order to clear the memory of the decoder at the base station. The frame is then provided to encoder 4, which provides forward error correction coding on the speech frame. The encoded symbols are provided to repetition generator 8 which provides repetition of the encoded symbol. Following repetition generator certain symbols are punctured by puncturing element 9 according to a predetermined puncturing pattern to provide a predetermined number of symbols within the frame. The symbols are then provided to interleaver 6 which reorders the symbols in accordance with a predetermined interleaving format. The interleaved symbols are provided on line 46 to modulator 26.

In the exemplary embodiment, modulator 26 modulates the data channels in accordance with a code division multiple access modulation format and provides the modulated information to transmitter (TMTR) 28, which amplifies and filters the signal and provides the signal through duplexer 30 for transmission through antenna 32.

In the exemplary embodiment, variable rate data source 1 sends a signal indicative to the rate of the encoded frame to control processor 36. In response to the rate indication, control processor 36 provides control signals to transmitter 28 indicating the energy of the transmissions.

In IS-95 and cdma2000 systems, a 20 ms frame is divided into sixteen sets of equal numbers of symbols, referred to as power control groups. The reference to power control is based on the fact that for each power control group, the base station receiving the frame issues a power control command in response to a determination of the sufficiency of the received reverse link signal at the base station.

Figure 3A:
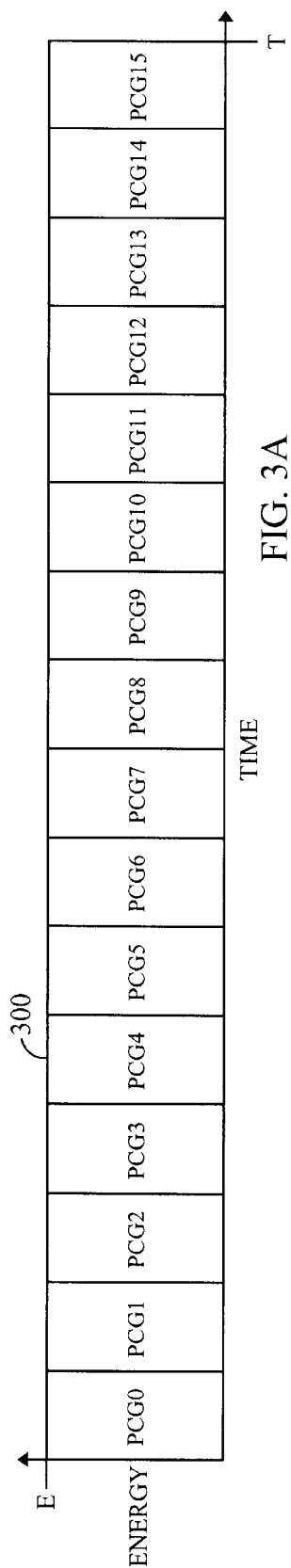
Figure 3B:
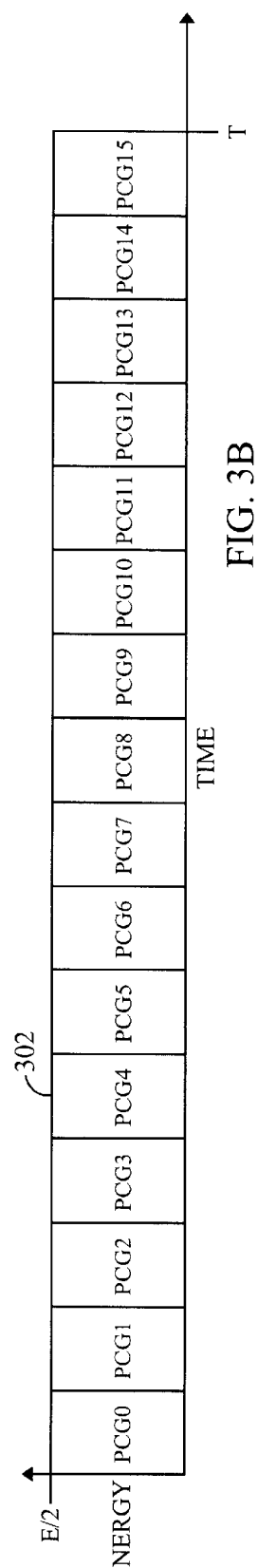
Figure 3C:
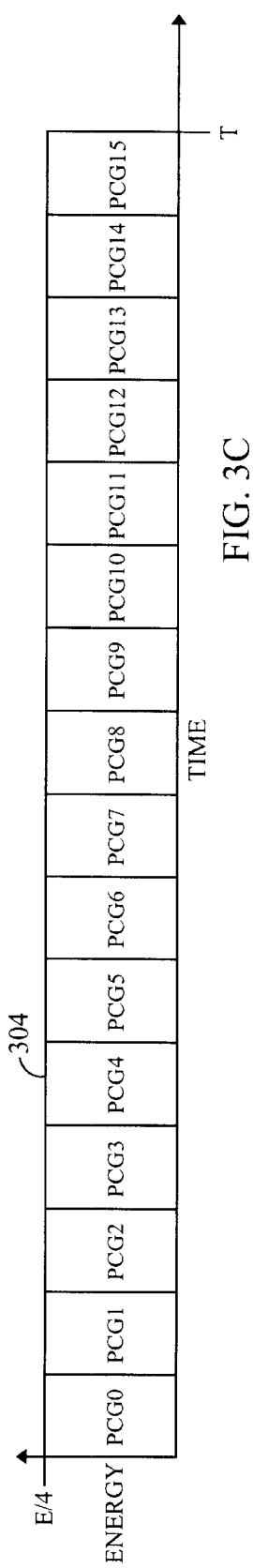

FIGS. 3A–3C illustrate the transmission energy versus time (in power control groups) for the three transmission rates- full, half, and quarter. In addition, FIGS. 3D–3G illustrate four separate alternative embodiments for the transmission at eighth rate frames in which half of the time no energy is transmitted. Because there is much redundancy introduced into the frames that are of less than full rate, the energy at which the symbols are transmitted may be reduced in approximate proportion to amount of additional redundancy in the frame.

In FIG. 3A, for full rate frame 300, each power control group PC0 through PC15 are transmitted at energy E. For the sake, of simplicity the frames are illustrated as being transmitted at an equal energy for the duration of the frame. One skilled in the art will understand the energy will vary over the frame and that what is represented in FIGS. 3A–3G can be thought of as the baseline energy at which the frames would be transmitted absent external effects. In the exemplary embodiment, remote station 50 responds to closed loop power control commands from the base station and from internally generated open loop power control commands based on the received forward link signal. The responses to the power control algorithms will causes the transmission energy to vary over the duration of a frame.

In FIG. 3B, for half rate frame 302, the energy is equal to half the predetermined maximum level, or E/2. This is represented in FIG. 3B The interleaver structure is such that it distributes the repeated symbols over the frame in such a way to attain maximum time diversity.

In FIG. 3C for quarter-rate transmission 304, the frame is transmitted at approximately one-quarter of the predetermined maximum level, or E/4.

In the exemplary embodiment, during the transmission of full rate, half rate and quarter rate frames, the pilot signal is continuously transmitted. However, in FIGS. 3D–3G transmitter 28 gates the transmission of half of the frame. In the preferred embodiment, during the periods in which the traffic channel transmissions are gated off, the pilot channel is also gated off to reduce battery consumption and increase reverse link capacity. In each of the embodiments, the frames are transmitted at a 50% duty cycle in which half of the time the energy of the transmission is gated off. During the period in which the frame is transmitted, the energy is scaled to approximately the energy at which a quarter rate frame is transmitted E/4. However, the inventors have through extensive simulation, determined the preferred average or baseline energy at which the eighth rate frames should be transmitted for each of the alternative embodiments for transmitting eighth rate frames. These energies have been computed to maximize battery savings and reverse link capacity while maintaining the level of reliability of transmission.

In the first embodiment, illustrated in FIG. 3D, the frame is transmitted such that it is gated off at alternating 1.25 ms. intervals. Thus, transmitter 28 is initially gated off for the first 1.25 ms. The second power control group (PCG1) is transmitted then with energy E1 during the second 1.25 ms. The third power control group (PCG2) is gated off. In this embodiment, all the odd PCGs (1, 3, 5, 7, 9, 11, 13, 15) are transmitted while all the even PCGs (0, 2, 4, 6, 8, 10,12, 14) are gated off. The puncturing structure discards half of the repeated symbols and provides approximately four versions of each transmitted symbol. In the preferred first embodiment, the symbols are transmitted at an average or baseline energy of 0.385E In the preferred embodiment, the gating of transmitter 28 is performed such that the last portions of the frame are not gated off. This is preferred because it allows for meaningful closed power control commands to be sent by the receiving base station to assist in reliable transmission of the subsequent frame.

In the second embodiment, which is the preferred embodiment of the present invention, illustrated in FIG. 3E, the frame is transmitted such that it is gated off at alternating 2.5 ms. intervals. The transmission method illustrated in FIG. 3E represents the preferred embodiment, because it results in optimum battery savings and reverse link capacity. During the first 2.5 ms. interval (PCG0 and PCG1) transmitter 28 is gated off. Then, transmitter 28 is gated on for next 2.5 ms (PCG2 and PCG3) and so on. I this embodiment PCGs 2, 3, 6, 7, 10, 11, 14, 15 are gated on, while PCGs 0, 1, 4, 5, 8, 9, 12, 13 are gated off. The puncturing structure is such that it discards exactly half of the repeated symbols during gate off in this embodiment. In the preferred second embodiment, the symbols are transmitted at an average or baseline energy of 0.32E.

In the third embodiment, illustrated in FIG. 3F, the frame is transmitted such that it is gated off at alternating 5.0 ms. intervals. During the first 5.0 ms. interval (PCG0–PCG3), transmitter 28 is gated off. Then, in the next 5.0 ms interval PCGs 4, 5, 6, 7 are transmitted and so on. In this embodiment PCGs 4, 5, 6, 7, 12, 13, 14, 15 are transmitted, while PCGs 0, 1, 2, 3, 8, 9, 10, 11 are gated off. The puncturing structure is such that it discards exactly half of the repeated symbols during gate off in this embodiment. In the preferred third embodiment, the symbols are transmitted at an average or baseline energy of 0.32E.

In the fourth embodiment, illustrated in FIG. 3G, the frame is transmitted such that it is gated off during the first 10 ms. In the next 10 ms interval PCGs 8 through 15 are transmitted. In this embodiment PCGs 8, 9, 10, 11, 12, 13, 14, 15 are transmitted, while PCGs 0, 1, 2, 3, 4, 5, 6, 7 are gated off. The interleaver structure is such that it discards exactly half of the repeated symbols during gate off in this embodiment. In the preferred fourth embodiment, the symbols are transmitted at an average or baseline energy of 0.335E.

Figure 2:
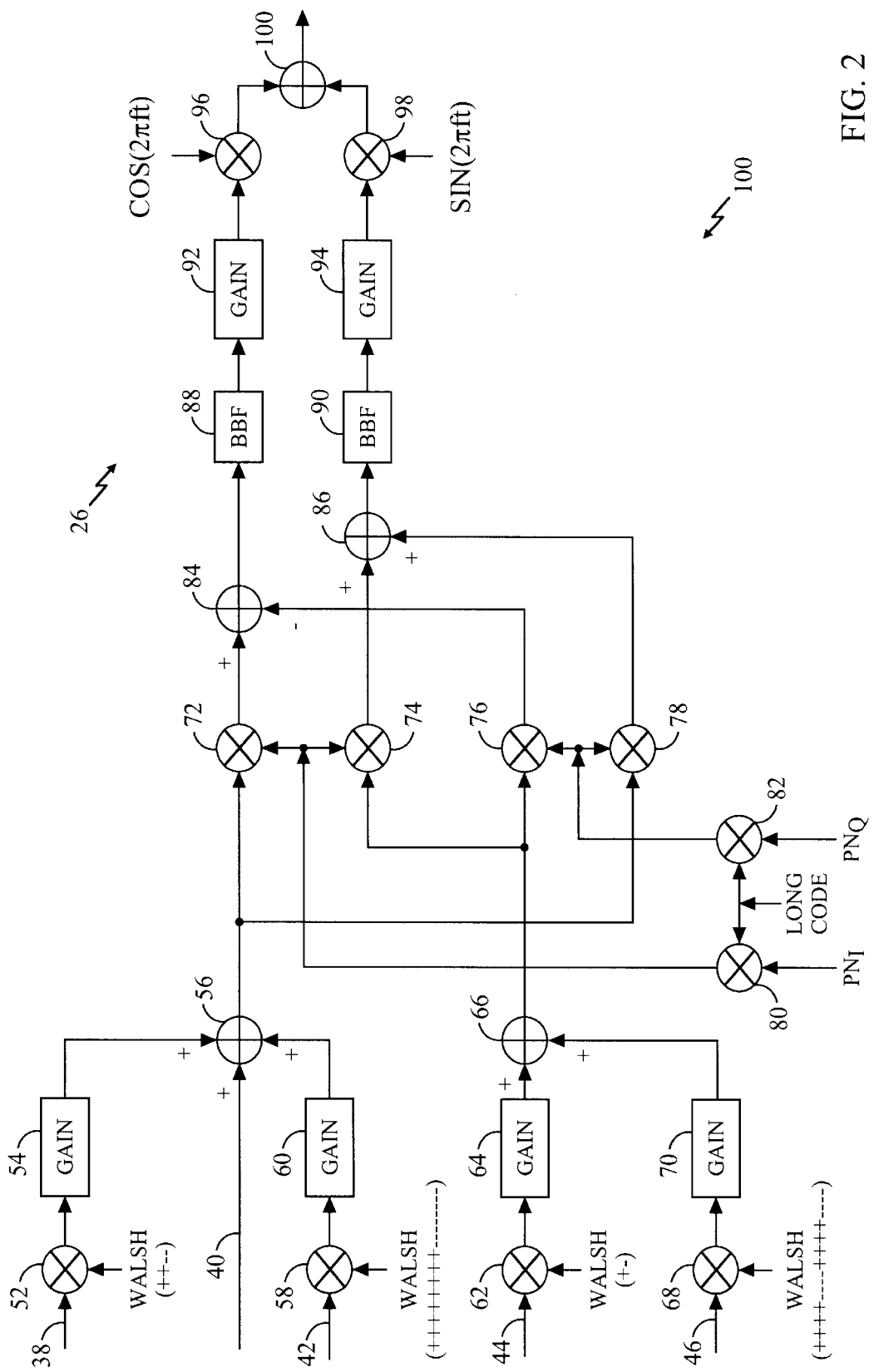
FIG. 2 is a functional block diagram of an exemplary embodiment of modulator 26 of FIG. 1.

FIG. 2 illustrates a functional block diagram of an exemplary embodiment of modulator 26 of FIG. 1. The first supplemental data channel data is provided on line 38 to spreading element 52 which covers the supplemental channel data in accordance with a predetermined spreading sequence. In the exemplary embodiment, spreading element 52 spreads the supplemental channel data with a short Walsh sequence (++−−). The spread data is provided to relative gain element 54 which adjusts the gain of the spread supplemental channel data relative to the energy of the pilot and power control symbols. The gain adjusted supplemental channel data is provided to a first summing input of summer 56. The pilot and power control multiplexed symbols are provided on line 40 to a second summing input of summing element 56.

Control channel data is provided on line 42 to spreading element 58 which covers the supplemental channel data in accordance with a predetermined spreading sequence. In the exemplary embodiment, spreading element 58 spreads the supplemental channel data with a short Walsh sequence (++++++++−−−−−−−−). The spread data is provided to relative gain element 60 which adjusts the gain of the spread control channel data relative to the energy of the pilot and power control symbols. The gain adjusted control data is provided to a third summing input of summer 56.

Summing element 56 sums the gain adjusted control data symbols, the gain adjusted supplemental channel symbols and the time multiplexed pilot and power control symbols and provides the sum to a first input of multiplier 72 and a first input of multiplier 78.

The second supplemental channel is provided on line 44 to spreading element 62 which covers the supplemental channel data in accordance with a predetermined spreading sequence. In the exemplary embodiment, spreading element 62 spreads the supplemental channel data with a short Walsh sequence (+−). The spread data is provided to relative gain element 64 which adjusts the gain of the spread supplemental channel data. The gain adjusted supplemental channel data is provided to a first summing input of summer 66.

The fundamental channel data is provided on line 46 to spreading element 68 which covers the fundamental channel data in accordance with a predetermined spreading sequence. In the exemplary embodiment, spreading element 68 spreads the fundamental channel data with a short Walsh sequence (++++−−−−++++−−−−). The spread data is provided to relative gain element 70 which adjusts the gain of the spread fundamental channel data. The gain adjusted fundamental channel data is provided to a second summing input of summer 66.

Summing element 66 sums the gain adjusted second supplemental channel data symbols and the fundamental channel data symbols and provides the sum to a first input of multiplier 74 and a first input of multiplier 76.

In the exemplary embodiment, a pseudonoise spreading using two different short PN sequences ($PN_I$ and $PN_Q$) is used to spread the data. In the exemplary embodiment the short PN sequences, $PN_I$ and $PN_Q$, are multiplied by a long PN code to provide additional privacy. The generation of pseudonoise sequences is well known in the art and is described in detail in aforementioned U.S. Pat. No. 5,103, 459. A long PN sequence is provided to a first input of multipliers 80 and 82. The short PN sequence $PN_I$ is provided to a second input of multiplier 80 and the short PN sequence $PN_Q$ is provided to a second input of multiplier 82.

The resulting PN sequence from multiplier 80 is provided to respective second inputs of multipliers 72 and 74. The resulting PN sequence from multiplier 82 is provided to respective second inputs of multipliers 76 and 78. The product sequence from multiplier 72 is provided to the summing input of subtractor 84. The product sequence from multiplier 74 is provided to a first summing input of summer 86. The product sequence from multiplier 76 is provided to the subtracting input of subtractor 84. The product sequence from multiplier 78 is provided to a second summing input of summer 86.

The difference sequence from subtractor 84 is provided to baseband filter 88. Baseband filter 88 performs necessary filtering on the difference sequence and provides the filtered sequence to gain element 92. Gain element 92 adjusts the gain of the signal and provides the gain adjusted signal to upconverter 96. Upconverter 96 upconverts the gain adjusted signal in accordance with a QPSK modulation format and provides the unconverted signal to a first input of summer 100.

The sum sequence from summer 86 is provided to baseband filter 90. Baseband filter 90 performs necessary filtering on difference sequence and provides the filtered sequence to gain element 94. Gain element 94 adjusts the gain of the signal and provides the gain adjusted signal to upconverter 98. Upconverter 98 upconverts the gain adjusted signal in accordance with a QPSK modulation format and provides the upconverted signal to a second input of summer 100. Summer 100 sums the two QPSK modulated signals and provides the result to transmitter 28.

Figure 4:
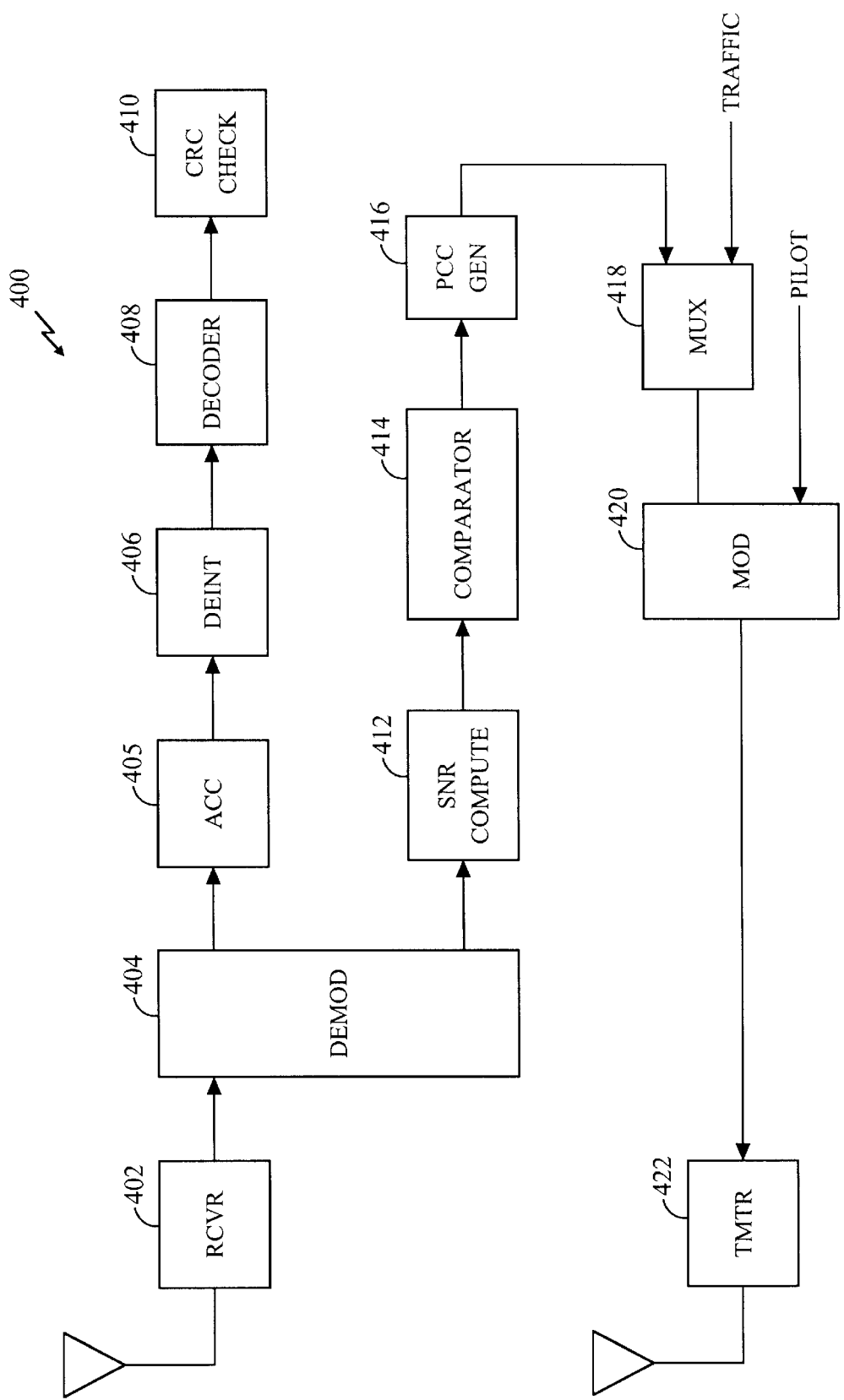
FIG. 4 is a functional block diagram of selected portions of a base station 400 in accordance with the present invention.

Turning now to FIG. 4, a functional block diagram of selected portions of a base station 400 in accordance with the present invention. Reverse link RF signals from the wireless communication device 50 (FIG. 1) are received by receiver (RCVR) 402, which downconverts the received reverse link RF signals to an baseband frequency. In the exemplary embodiment, receiver 402 down converts the received signal in accordance with a QPSK demodulation format. The baseband signal is then demodulated by demodulator 404. Demodulator 404 is further described with reference to FIG. 5 below.

The demodulated signal is provided to accumulator 405. Accumulator 405 sums the symbol energies of the redundantly transmitted power control groups of symbols. The accumulated symbols energies are provided to de-interleaver 406 which reorders the symbols in accordance with a predetermined de-interleaving format. The reordered symbols are provided to decoder 408 which decodes the symbols to provide an estimate of the transmitted frame. The estimate of the transmitted frame is then provided to CRC check 410 which determines the accuracy of the frame estimate based on the CRC bits included in the transmitted frame.

In the exemplary embodiment, base station 400 performs a blind decoding on the reverse link signal. Blind decoding describes a method of decoding variable rate data in which the receiver does not know a priori the rate of the transmission. In the exemplary embodiment, base station 400 accumulates, deinterleaves and decodes the data in accordance with each possible rate hypothesis. The frame selected as the best estimate is based on quality metrics such as the symbol error rate, the. CRC check and the Yamamoto metric.

The demodulated symbols are also provided from demodulator 404 to signal to noise ration (SNR) calculator 412. In the exemplary embodiment, SNR calculator 412 estimates the signal to noise ratio of the received reverse link signal. One skilled in the art will appreciate that other signal quality metrics such as received power can be used as the basis of the reverse link power control signal.

The signal quality metric from SNR calculator 412 is provided to comparator 414. Comparator 414 compares the signal quality metric against a threshold value. The threshold value may be fixed or variable. In the preferred embodiment, the threshold is controlled by an outer loop process that varies the threshold in order to provide a desired level of reliability in receiving the reverse link signal.

A signal indicative of the result of the comparison is provided to power control command generator 416. In the exemplary embodiment, when the signal quality metric is less than the threshold value a '0' is transmitted and when the signal quality metric exceeds the threshold value, a '1' is transmitted.

In the exemplary embodiment, the closed loop power control commands are multiplexed with the forward dedicated traffic data. The power control commands are provided to multiplexer (MUX) 418 which combines the power control commands with the traffic data in predetermined locations. The combined power control commands and traffic data for each remote station in communication with base station 400, as well as, pilot channel and overhead channels are modulated in modulator 420. In the exemplary embodiment, the modulation of the traffic channels is similar to the modulation of the fundamental channel of the reverse link. In the exemplary embodiment, the forward link is a CDMA signal modulated in accordance with the cdma2000 ITU Candidate submission. The modulated data is provided to transmitter (TMTR) 422 which up converts, amplifies and filter the signal for transmission to remote station 50.

Figure 5:
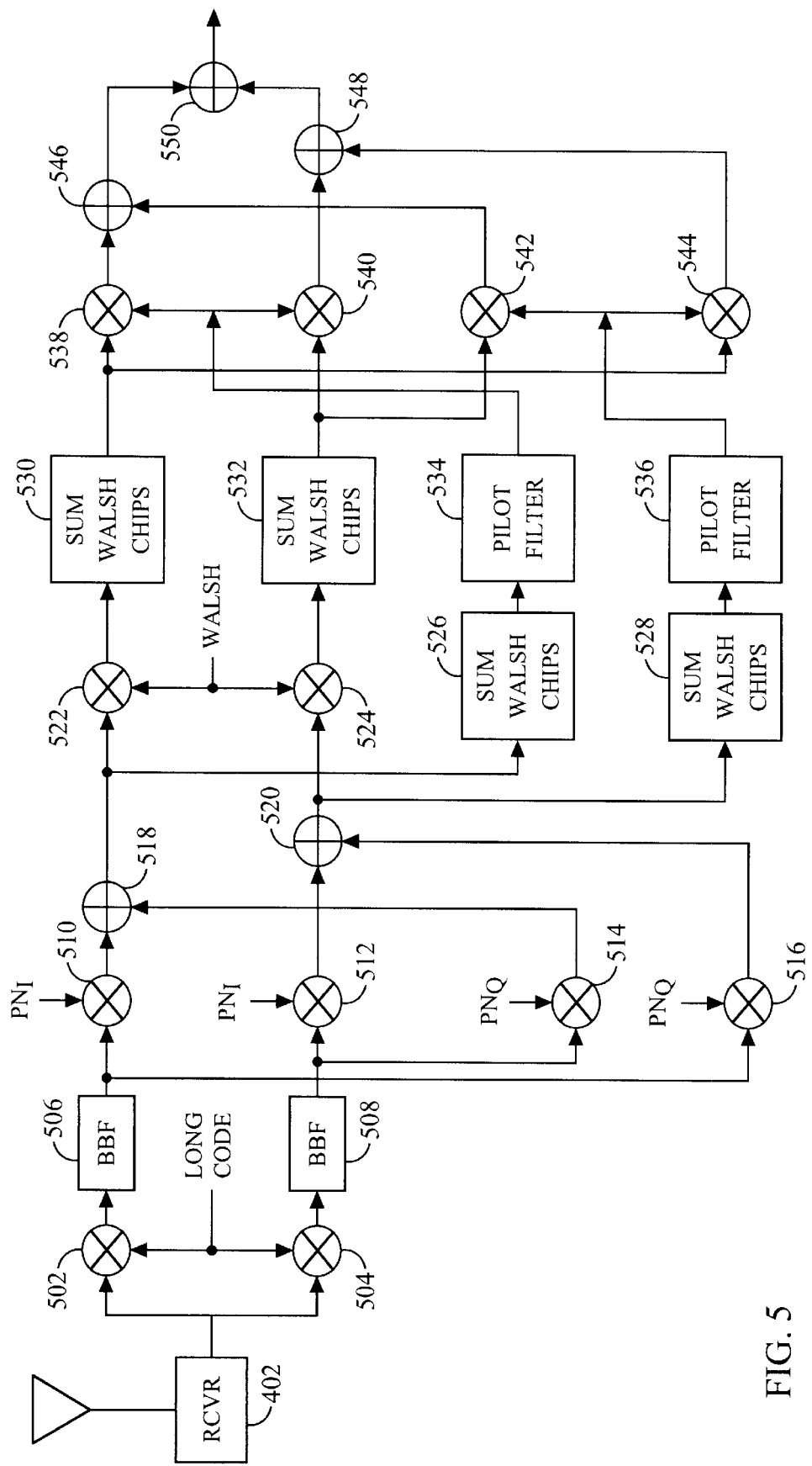
FIG. 5 is an expanded functional block diagram of an exemplary single demodulation chain of demodulator 404 of FIG. 4.

Turning now to FIG. 5, an expanded functional block diagram of an exemplary single demodulation chain of demodulator 404 is shown. In the preferred embodiment, demodulator 404 has one demodulation chain for each information channel. The exemplary demodulator 404 of FIG. 5 performs complex demodulation on signals modulated by the exemplary modulator 26 of FIG. 1. As previously described, receiver (RCVR) 402 downconverts the received reverse link RF signals to a baseband frequency, producing I and Q baseband signals. Despreaders 502 and 504 respectively despread the I and Q baseband signals using the long code from FIG. 1. Baseband filters (BBF) 506 and 508 respectively filter the I and Q baseband signals.

Despreaders 510 and 514 respectively despread the I and Q signals using the $PN_I$ sequence of FIG. 2. Similarly, despreaders 514 and 516 respectively despread the Q and I signals using the $PN_Q$ sequence of FIG. 2. The outputs of despreaders 510 and 512 are combined in combiner 518. The output of despreader 516 is subtracted from the output of despreader 512 in combiner 520.

The respective outputs of combiners 518 and 520 are then Walsh-uncovered in Walsh-uncoverers 522 and 524 with the Walsh code that was used to cover the particular channel of interest in FIG. 2. The respective outputs of the Walsh-uncoverers 522 and 524 are then summed over one Walsh symbol by accumulators 530 and 532.

The respective outputs of combiners 518 and 520 are also summed over one Walsh symbol by accumulators 526 and 528. The respective outputs of accumulators 526 and 528 are then applied to pilot filters 534 and 536. Pilot filters 534 and 536 generate an estimation of the channel conditions by determining the estimated gain and phase of the pilot signal data 40 (see FIG. 1). The output of pilot filter 534 is then complex multiplied by the respective outputs of accumulators 530 and 532 in complex multipliers 538 and 540. Similarly, the output of pilot filter 536 is complex multiplied by the respective outputs of accumulators 530 and 532 in complex multipliers 542 and 544. The output of complex multiplier 542 is then summed with the output of complex multiplier 538 in combiner 546. The output of complex multiplier 544 is subtracted from the output of complex multiplier 540 in combiner 548. Finally, the outputs of combiners 546 and 548 are combined in combiner 550 to produce the demodulated signal of interest for input to Accumulator.

Figure 6:
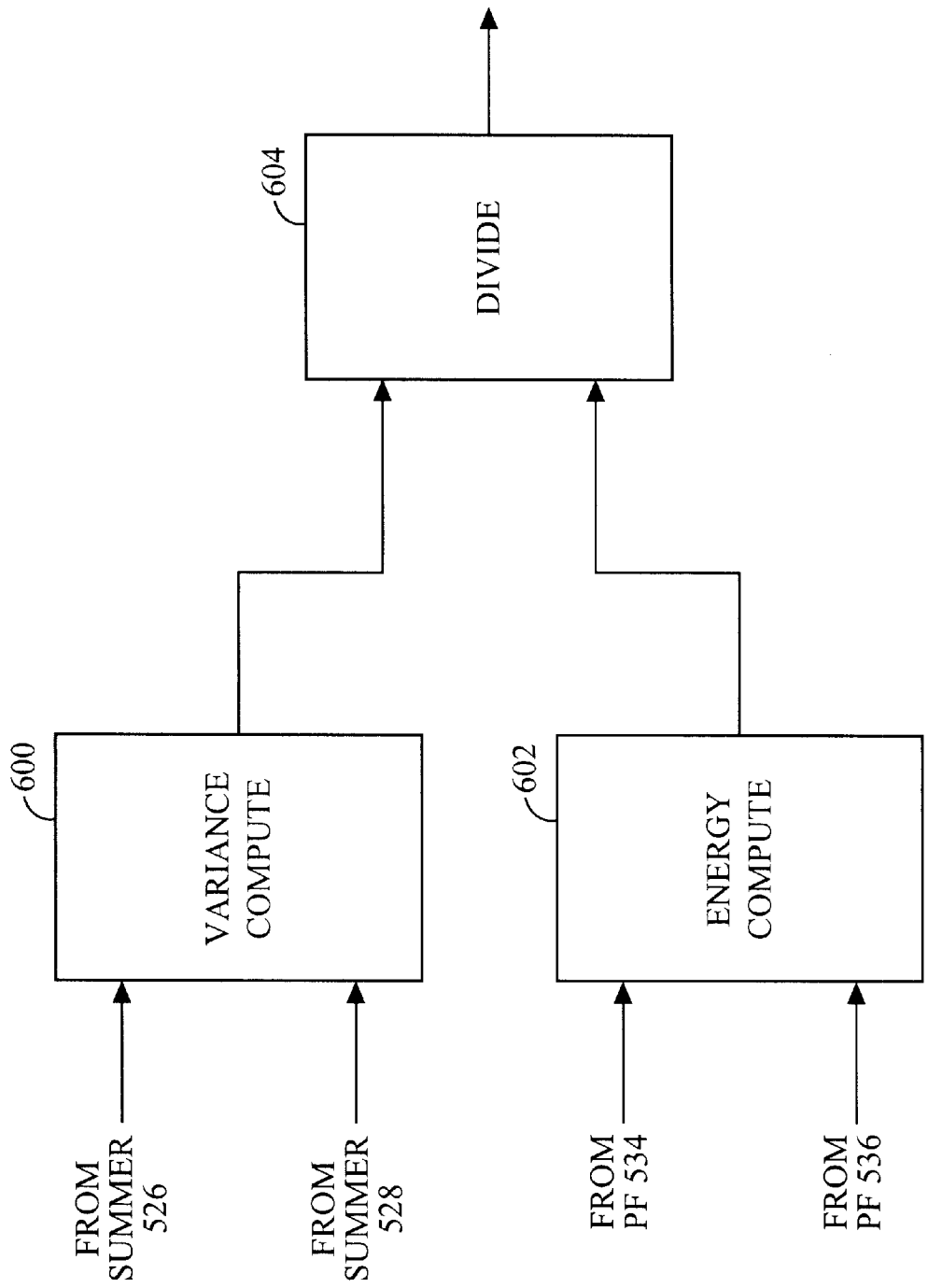
FIG. 6 is a block diagram illustrating the apparatus for measuring the signal to noise ratio of the forward link power control mechanism of the present invention.

FIG. 6 illustrates an exemplary apparatus for measuring the signal to noise ratio. In the exemplary embodiment, in order to estimate the noise on the received signal, the variance of energy on the received reverse link signal is estimated. The demodulated pilot symbols prior to the pilot filtering operation, the outputs of summers 526 and 528, are provided to variance computer 600. The signal energy is estimated as the sum of the squares of the demodulated and filtered received pilot symbols from pilot filters 534 and 536. The estimated noise energy from variance calculator 600 and signal energy from energy calculator 602 are provided to divider 604. The signal energy is normalized by the estimated noise energy and is provided, in the exemplary embodiment, as the signal quality metric to comparator 414. Other methods of computing signal to noise ratio are equally well known in the art and are within the scope of the present invention.

Figure 7:
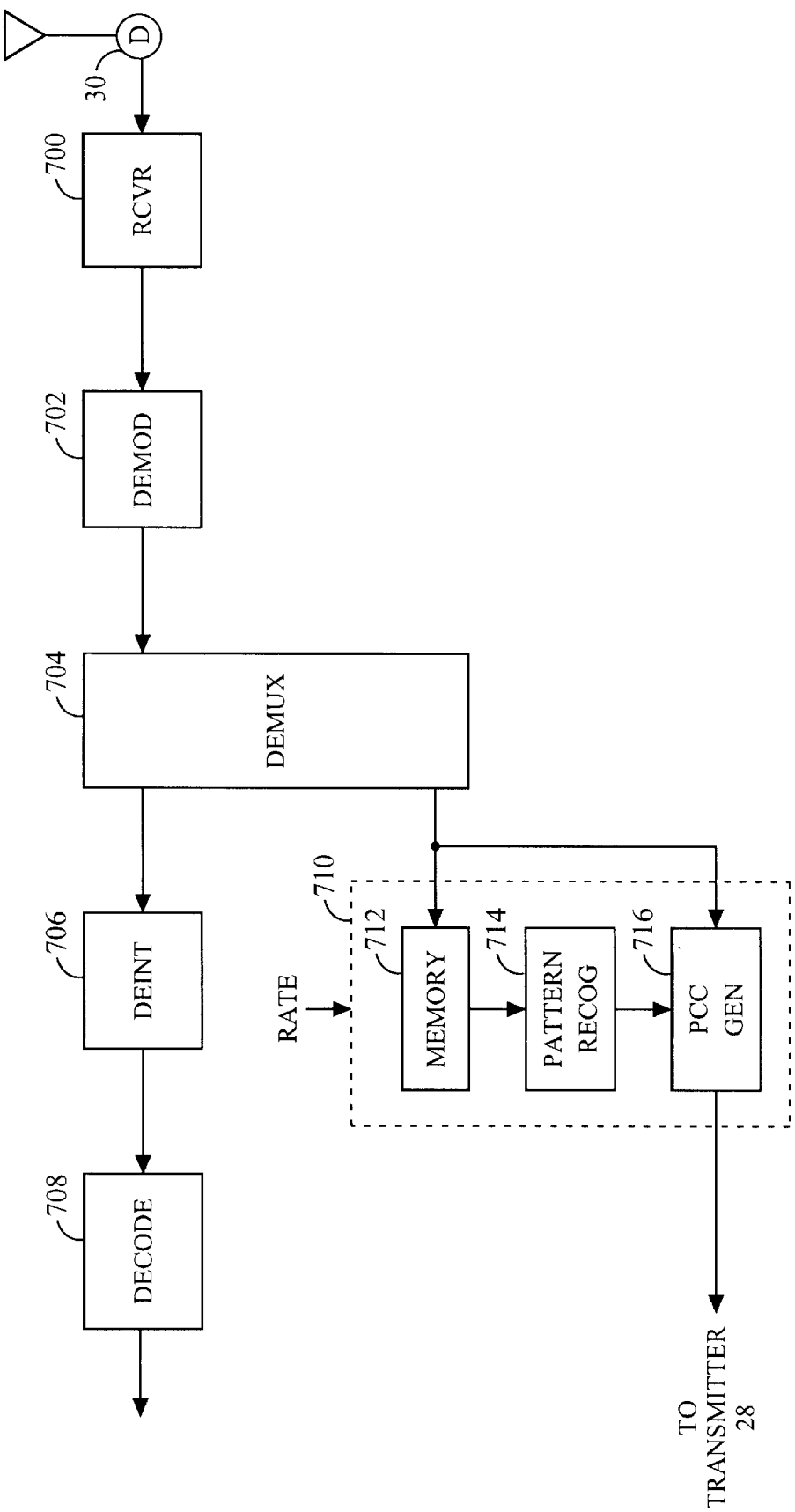
FIG. 7 is a functional block diagram of an exemplary receive subsystem of the present invention.

Turning to FIG. 7, the receive subsystem of remote station 50 is illustrated. The forward link signal is received and provided through duplexer 30 to receiver 700. Receiver 700 downconverts, amplifies and filters the received signal. In the exemplary embodiment, receiver 700 downconverts the received signal in accordance with a QPSK demodulation format.

The received signal components (in phase and quadrature phase components) are provided to demodulator 702. In the exemplary embodiment, demodulator 702 operates as described with respect to demodulator 404. The demodulated symbols are provided to demultiplexer 704 which separates the reverse link power control commands from the traffic data symbols. The traffic data symbols are provided to deinterleaver 706 which reorders the demodulated traffic symbols in accordance with a predetermined deinterleaving format. The reordered symbols are then provided to decoder 708 and decoded.

Power control commands are provided to power control processor 710. In the present invention, portions of the frames are gated out by recognizing the pattern of power control commands that will be issued in response to eighth rate gated frames. At base station 400, the signal energy is computed and normalized and compared to a threshold value. And based on this comparison, the reverse link power control commands are generated. However, during the portions of the frame which are gated out the reverse link power control commands generated by base station 400 are not based on the signal energy of the gated portions of the eighth rate frame and will always indicate a request for the transmitter to increase its transmission energy by sending and UP or "1" command.

In the first embodiment, illustrated in FIG. 3D, the frame is transmitted such that it is gated off at alternating 1.25 ms. intervals. Thus, transmitter 28 is initially gated off for the first 1.25 ms. The second power control group (PCG1) is transmitted then with energy El during the second 1.25 ms. The third power control group (PCG2) is gated off. In this embodiment, all the odd PCGs (1, 3, 5, 7, 9, 11, 13, 15) are transmitted while all the even PCGs (0, 2, 4, 6, 8, 10, 12, 14) are gated off.

Figure 8A:
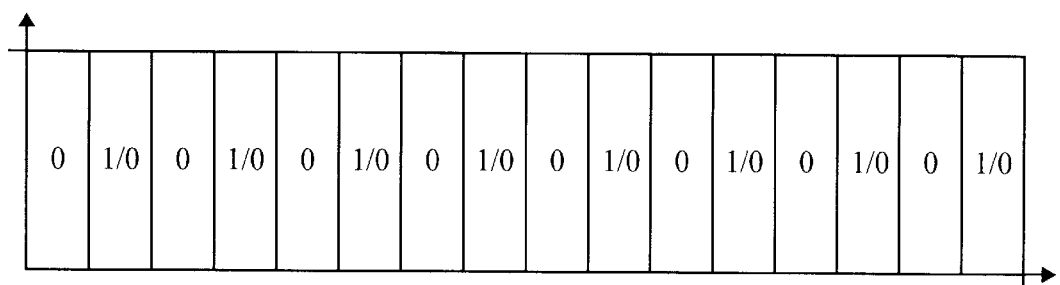
FIG. 8 illustrates exemplary power control bit streams generated in response to received eight rate gated frames.
Figure 8B:
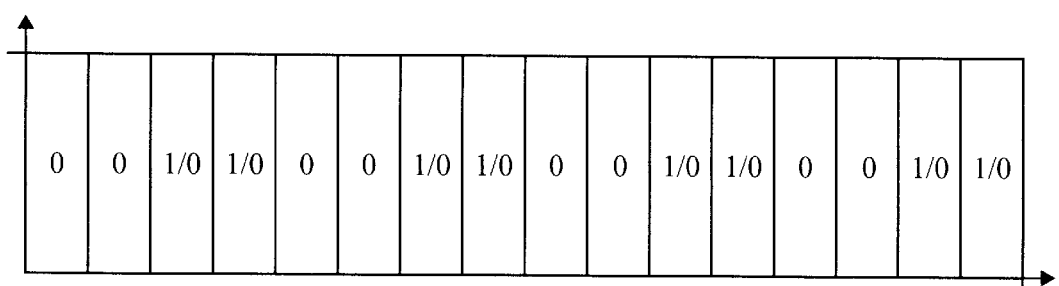

In response to the reception of an eighth rate gated frame of this format, base station 400 generates a power control bit stream illustrated in FIG. 8B. In response to the power control groups of the frame that are gated off (PCGs 0, 1, 4, 5, 8, 9, 12, 13), base station 400 will transmit power control commands requesting the remote station to increase its transmission energy, illustrated as "1" commands. In response to the power control groups of the frame that are gated on (PCGs 2, 3, 6, 7, 10, 11, 14, 15), base station 400 will transmit meaningful power control commands requesting the remote station to either increase or decrease its transmission energy, illustrated as "1/0" commands.

In the second embodiment, which is the preferred embodiment of the present invention, illustrated in FIG. 3E, the frame is transmitted such that it is gated off at alternating 2.5 ms. intervals. The transmission method illustrated in FIG. 3E represents the preferred embodiment, because it results in optimum battery savings and reverse link capacity. During the first 2.5 ms. interval (PCG0 and PCG1) transmitter 28 is gated off. Then, transmitter 28 is gated on for next 2.5 ms (PCG2 and PCG3) and so on. In this embodiment PCGs 2, 3, 6, 7, 10, 11, 14, 15 are gated on, while PCGs 0, 1, 4, 5, 8, 9, 12, 13 are gated off.

In response to the reception of an eighth rate gated frame of this format, base station 400 generates a power control bit stream illustrated in FIG. 8A. In response to the power control groups of the frame that are gated off (PCGs 0, 1, 4, 5, 8, 9, 12, 13), base station 400 will transmit power control commands requesting the remote station to increase its transmission energy, illustrated as "1" commands. In response to the power control groups of the frame that are gated on (PCGs 2, 3, 6, 7, 10, 11, 14, 15), base station 400 will transmit meaningful power control commands requesting the remote station to either increase or decrease its transmission energy, illustrated as "1/0" commands.

In the third embodiment, illustrated in FIG. 3F, the frame is transmitted such that it is gated off at alternating 5.0 ms. intervals. During the first 5.0 ms. interval (PCG0–PCG3), transmitter 28 is gated off. Then, in the next 5.0 ms interval PCGs 4, 5, 6, 7 are transmitted and so on. In this embodiment PCGs 4, 5, 6, 7, 12, 13, 14, 15 are transmitted, while PCGs 0, 1, 2, 3, 8, 9, 10, 11 are gated off.

Figure 8C:
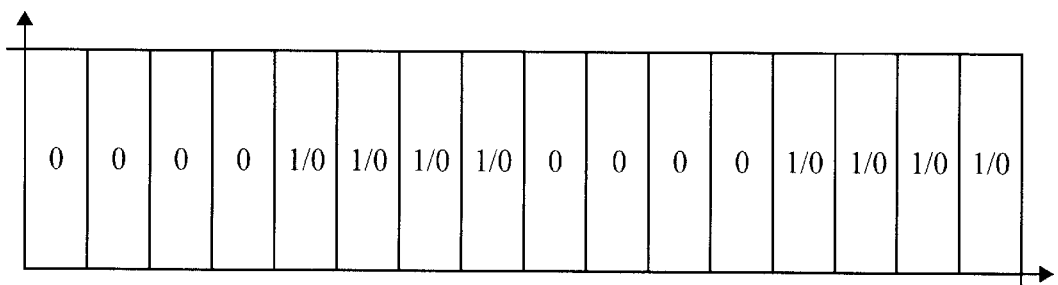

In response to the reception of an eighth rate gated frame of this format, base station 400 generates a power control bit stream illustrated in FIG. 8C. In response to the power control groups of the frame that are gated off (PCGs 0, 1, 2, 3, 8, 9, 10, 11), base station 400 will transmit power control commands requesting the remote station to increase its transmission energy, illustrated as "1" commands. In response to the power control groups of the frame that are gated on (PCGs 4, 5, 6, 7, 12, 13, 14, 15), base station 400 will transmit meaningful power control commands requesting the remote station to either increase or decrease its transmission energy, illustrated as "1/0", commands.

In the fourth embodiment, illustrated in FIG. 3G, the frame is transmitted such that it is gated off during the first 10 ms. In the next 10 ms interval PCGs 8 through 15 are transmitted. In this embodiment PCGs 8, 9, 10, 11, 12, 13, 14, 15 are transmitted, while PCGs 0, 1, 2, 3, 4, 5, 6, 7 are gated off. The interleaver structure is such that it discards exactly half of the repeated symbols during gate off in this embodiment. In the preferred second embodiment, the symbols are transmitted at an average or baseline energy of 0.335E.

Figure 8D:
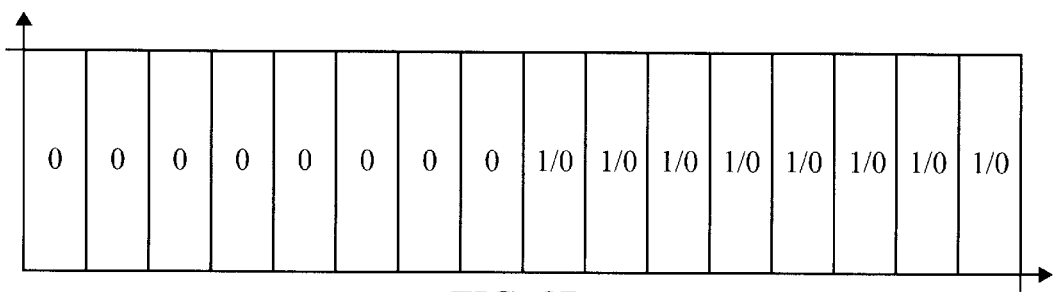

In response to the reception of an eighth rate gated frame of this format, base station 400 generates a power control bit stream illustrated in FIG. 8D. In response to the power control groups of the frame that are gated off (PCGs 0, 1, 2, 3, 4, 5, 6, 7), base station 400 will transmit power control commands requesting the remote station to increase its transmission energy, illustrated as "1" commands. In response to the power control groups of the frame that are gated on (PCGs 8, 9, 10, 11, 12, 13, 14, 15), base station 400 will transmit meaningful power control commands requesting the remote station to either increase or decrease its transmission energy, illustrated as "1/0" commands.

In the present invention, power control processor 710 identifies the reverse link power control commands generated in response to gated eighth rate frame by representative patterns in the power control command stream. In a preferred embodiment, power control processor also uses rate information provided by variable rate data source 1 to assist in the identification of the erroneous power control commands.

The power control commands are provided to power control processor 710. Power control processor 710 provides the received power control bit estimates to memory element 712 and to power control command generator 716.

In the first exemplary embodiment of the present invention, power control processor will initially assume that the power control bits received were not in response to a gated eighth rate frame and will adjust the transmission energy of the reverse link signal based on the received power control bit estimates. Then after predetermined number of the power control bit estimates for the current frame have been received, memory element 712 provides the estimates to pattern recognition means 714, which based on the characteristic patterns illustrate in FIGS. 8A–8D will identify power control command streams based on gated eighth rate frames.

If the received power control bit estimates based on the current frame indicate the frame that was received by base station 400 was a gated eighth rate frame, then pattern recognition means 714 provides a signal to power control command generator 716 inhibiting adjustments to the transmission energy based on the power control bit estimates received for the rest of the frame.

In an improved embodiment, the pattern recognition means 714 provides a signal to power control command generator 716 indicating that the current set of power control commands were generated based on a gated eighth rate frame, then power control command generator sends a signal to transmitter 28 "undoing" the increases to the transmission energy that were a result of the power control bit estimates generated based on the gated eighth rate portions of the frame.

In an alternative embodiment, power control command generator 716 is inhibited initially, and after a determination that the frame upon which the currently received power control bit estimates are based is not eighth rate frame then power control command generator 716 is reactivated.

In a third improved embodiment, power control processor 710 assumes that the frame upon which the currently received power control bit estimates are based is an eighth rate frame if the previous frame upon which the previously received power control bit estimates were based was an eighth rate frame. This follows from the fact that pauses in speech happen in intervals of time greater than the duration of a single frame. When one pauses, for example to listen, then the duration of the pause can last for many frame intervals and the probability that frame is an eighth rate frame is substantially higher when the previous frame was eighth rate. In this embodiment, power control command generator 716 is inhibited initially, and after a determination that the frame upon which the currently received power control bit estimates are based is not eighth rate frame then power control command generator is reactivated.

In an improved embodiment, the rate of frames transmitted by the remote station are provided to memory element 712. In this fashion once the first eighth rate frame is identified then the remote station will know how many more power control bits based on eighth rate gated frames to expect.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication device, a method for controlling transmission energy of a remote station in response to received closed loop power control commands, comprising the steps of:

a) identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating power control commands; and (b) adjusting transmission energy in response to said step of identifying ones of said received closed loop power control commands generated based upon gated out portions of a reverse link signal.

2. In a wireless communication device, a method for controlling transmission energy of a remote station in response to received closed loop power control commands, comprising the steps of:

a) identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating groups of two power control commands; and (b) adjusting transmission energy in response to said step of identifying ones of said received closed loop power control commands generated based upon gated out portions of a reverse link signal.

3. In a wireless communication device, a method for controlling transmission energy of a remote station in response to received closed loop power control commands, comprising the steps of:

a) identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating groups of four power control commands; and, (b) adjusting transmission energy in response to said step of identifying ones of said received closed loop power control commands generated based upon gated out portions of a reverse link signal.

4. In a wireless communication device, a method for controlling transmission energy of a remote station in response to received closed loop power control commands, comprising the steps of:

a) identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating groups of eight power control commands; and (b) adjusting transmission energy in response to said step of identifying ones of said received closed loop power control commands generated based upon gated out portions of a reverse link signal.

5. In a wireless communication device, a method for controlling transmission energy of a remote station in response to received closed loop power control commands, comprising the steps of:

(a) identifying ones of said received closed loop power control commands generated based upon gated out portions of a reverse link signal wherein said step of identifying is performed based upon a predetermined pattern of said received closed loop power control commands; and (b) adjusting transmission energy in response to said step of identifying ones of said received closed loop power control commands generated based upon gated out portions of a reverse link signal, comprising adjusting transmission energy until recognizing a pattern of power control commands based on gated signals and then inhibiting adjustment of said transmission energy.

6. In a wireless communication device, a method for controlling transmission energy of a remote station in response to received closed loop power control commands, comprising the steps of:

(a) Identifying ones of said received closed loop power control commands generated based upon gated out portions of a reverse link signal wherein said step of identifying is performed based upon a predetermined pattern of said received closed loop power control commands; and (b) adjusting transmission energy in response to said step of identifying ones of said received closed loop power control commands generated based upon gated out portions of a reverse link signal, comprising correcting adjustment of said transmission energy based on the number of previous adjustments made in response to said ones of said received closed loop power control commands generated based upon gated out portions of a reverse link signal.

7. A remote station for controlling transmission energy in response to received closed loop power control commands comprising:

(a) a pattern recognizer for identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating power control commands; and (b) a power control command generator for generating commands to adjust transmission energy In response to said step of identifying ones of said received closed loop power control commands generated based upon gated out portions of a reverse link signal.

8. A remote station for controlling transmission energy in response to received closed loop power control commands comprising:

(a) a pattern recognizer for identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating groups of two power control commands; and (b) a power control command generator for generating commands to adjust transmission energy in response to said step of identifying ones of said received closed loop power control commands generated based upon gated out portions of a reverse link signal.

9. A remote station for controlling transmission energy in response to received closed loop power control commands comprising:

(a) a pattern recognizer for identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating groups of four power control commands; and (b) a power control command generator for generating commands to adjust transmission energy in response to said step of identifying ones of said received closed loop power control commands generated based upon gated out portions of a reverse link signal.

10. A remote station for controlling transmission energy in response to received closed loop power control commands comprising:

(a) a pattern recognizer for identifying ones of said received closed loop power control commands generated based upon gated out portions of a reverse link signal wherein said step of identifying is performed by receiving a predetermined number of power control bit estimates requesting said remote station to increase its transmission energy in a set of said received closed loop power control commands consisting of alternating groups of eight power control commands; and (b) a power control command generator for generating commands to adjust transmission energy in response to said step of identifying ones of said received closed loop power control commands generated based upon gated out portions of a reverse link signal.

11. A remote station for controlling transmission energy in response to received closed loop power control commands comprising:

(a) a pattern recognizer for identifying ones of said received closed loop power control commands generated based upon gated out portions of a reverse link signal wherein said step of identifying is performed based upon a predetermined pattern of said received closed loop power control commands; and (b) a power control command generator for generating commands to adjust transmission energy in response to said step of identifying ones of said received closed loop power control commands generated based upon gated out portions of a reverse link, also for adjusting transmission energy until the pattern recognizer recognizes a pattern of power control commands based on gated signals and then generates commands to inhibit adjustment of said transmission energy.

12. A remote station for controlling transmission energy in response to received closed loop power control commands comprising:

(a) a pattern recognizer for identifying ones of said received closed loop power control commands generated based upon gated out portions of a reverse link signal wherein said step of identifying is performed based upon a predetermined pattern of said received closed loop power control commands; and (b) a power control command generator for generating commands to adjust transmission energy in response to said step of identifying ones of said received closed loop power control commands generated based upon gated out portions of a reverse link, also for adjusting transmission energy based on the number of previous adjustments made in response to received closed loop power control commands generated based upon gated out portions of a reverse link signal.

13. A method for controlling transmission energy of a frame, comprising:

(a) identifying reverse link power control commands received in response to previously transmitted gated frames by recognizing representative patterns in a received power control command stream; and (b) compensating for the identified power control commands by adjusting the transmission energy according to received power control commands until the representative patterns are recognized and then inhibiting adjustments to the transmission energy based on the received power control commands for the remainder of the frame.

14. A method for controlling transmission energy of a frame, comprising:

(a) identifying reverse link power control commands received In response to previously transmitted gated frames by recognizing representative patterns in a received power control command stream; and (b) compensating for the identified power control commands by:

adjusting the transmission energy, storing the rate of transmitted frames; and calculating an expected number of power control commands to be received in response to eighth rate gated frames.

15. A remote station for controlling transmission energy of a frame, comprising:

a pattern recognizer for identifying reverse link power control commands received in response to previously transmitted gated frames by recognizing representative patterns in a received power control command stream; and a power control command generator for generating commands to compensate for the identified power control commands by adjusting the transmission energy according to received power control commands until the representative patterns are recognized and then inhibiting adjustments to the transmission energy based on the received power control commands for the remainder of the frame.

16. A remote station for controlling transmission energy of a frame, comprising:

a pattern recognizer for identifying reverse link power control commands received in response to previously transmitted gated frames by recognizing representative patterns in a received power control command stream; and a power control command generator for generating commands to compensate for the identified power control commands by adjusting the transmission energy, also for storing the rate of transmitted frames and calculating an expected number of power control commands to be received in response to eighth rate gated frames.

* * * * *